United States Patent [19]

Narayanan et al.

[11] Patent Number: 5,510,307
[45] Date of Patent: Apr. 23, 1996

[54] FREE RADICAL INITIATOR DELIVERY SYSTEM

[75] Inventors: Kolazi S. Narayanan, Wayne, N.J.; Waldo De Thomas, Saylorsburg, Pa.

[73] Assignee: ISP Investments Inc., Wilmington, Del.

[21] Appl. No.: 345,173

[22] Filed: Nov. 28, 1994

Related U.S. Application Data

[63] Continuation-in-part of Ser. No. 44,520, Apr. 8, 1993, Pat. No. 5,270,271, and a continuation-in-part of Ser. No. 44,136, Apr. 8, 1993, Pat. No. 5,362,698.

[51] Int. Cl.$^6$ .................................................. B01J 31/00
[52] U.S. Cl. .................... 502/159; 502/160; 502/167; 502/168; 502/172
[58] Field of Search ................................ 502/159, 160, 502/161, 168, 172

[56] References Cited

U.S. PATENT DOCUMENTS

| | | | |
|---|---|---|---|
| 3,691,125 | 9/1972 | Barabas et al. | 526/264 |
| 3,862,915 | 1/1975 | Fried et al. | 526/264 |
| 4,178,263 | 12/1979 | Priddy | 502/160 |
| 4,842,765 | 6/1989 | Satomi | 502/160 |
| 5,270,271 | 12/1993 | Lundin et al. | 502/160 |
| 5,347,055 | 9/1994 | Priddy et al. | 502/160 |

*Primary Examiner*—Sharon Gibson
*Attorney, Agent, or Firm*—Marilyn J. Maue; Walter Katz; Joshua J. Ward

[57] ABSTRACT

This invention relates to an improved polymerization free radical initiator delivery system for the polymerization of monomers containing olefinic unsaturation and to the preparation of the initiator which comprises dissolving a water insoluble free radical initiator and an excess amount of the polymeric product of the reaction in a mutual organic solvent having a boiling point below 140° C., in the presence of between about 1.0 and 100 wt. % of a surfactant based on weight of initiator and mixing the resulting solution to achieve uniform molecular distribution of initiator and polymer molecules in the surfactant/solvent mixture; removing the solvent to provide coprecipitated initiator/polymer microparticles and then diluting the coprecipitated microparticles with water under vigorous agitation to form a microparticle emulsion of low viscosity which is suitable as the initiator feed for contact with monomer in a polymerization reaction.

11 Claims, No Drawings

FREE RADICAL INITIATOR DELIVERY SYSTEM

This application is a continuation-in-part of patent application Ser. No. 08/44,520 and Ser. No. 08/44,136, both filed Apr. 8, 1993, now U.S. Pat. Nos. 5,270,271 and 5,362,698, respectively, for inventors Waldo De Thomas and Kolazi S. Narayanan and assigned to ISP Investments Inc.

A major difficulty encountered with many polymerization initiators, such as the peroxy and azo initiators, is their insolubility in reaction media. In carrying out polymerizations, particularly in those polymerizations which employ continuous or timed addition, these initiators must be solubilized in order to be effective. Some processes have used predissolution of initiator in mineral spirits or other organic solvents; however, these additives cause product quality problems which are not easily rectified. To overcome this difficulty, predissolution of the initiator in monomer has been employed, but this solution leads to other difficulties involving highly reactive vinyl monomers, such as vinyl lactams, vinyl acetate, maleic anhydride, acrylates and the like, which rapidly polymerize and cause polymer plugging in the pumps, valves and feed lines of the process unless close temperature control and other reaction parameters are closely maintained.

The initiator feed preparation disclosed in U.S. Pat. No. 3,862,915 suggests suspending crystalline azo type initiators in an 0.5–30% aqueous solution of polymer. However, the initiator feed prepared by this method has not found general acceptance since such suspensions are relatively unstable and the presence of free polymeric product has the tendency toward early termination of the desired monomeric polymerization reaction. Also the initiator crystals in the suspension are not employed at maximum efficiency since the crystalline size does not approach microcrystallization which is desired for higher efficacy.

Accordingly, it is an object of the present invention to overcome the above difficulties by providing an efficient, commercially feasible free radical initiator delivery system for homo- and co-polymerization of olefinic monomers.

Another object of this invention is to provide a highly stable initiator feed in liquid form which avoids the presence of any extraneous solvent or diluent in the polymerization reaction.

These and other objects will become apparent from the following description and disclosure.

THE INVENTION

In accordance with this invention, there is provided an emulsified polymer/free radical initiator delivery system for the polymerization of monomers containing olefinic unsaturation which is prepared by dissolving a water insoluble free radical initiator and an excess amount of a polymeric product of the polymerization reaction in a mutual organic solvent having a boiling point below 140° C., optionally in the presence of between about 1.0 and about 100 wt. % of a surfactant, based on weight of initiator; agitating the resulting solution to obtain uniform distribution of polymer and initiator molecules in the solvent mixture; removing the solvent to provide a coprecipitated, solid mixture of initiator and polymer in the form of microparticles of between about 0.01 and about 100 micron size and then diluting the coprecipitated microparticles with water under vigorous agitation to form a stable microemulsion which is suitable as a premixed initiator feed for contact with monomer in the polymerization reaction.

Any of the various water insoluble free radical initiators, particularly the solid initiators, can be employed as the initiator feed composition in the above process. Examples of suitable initiators include the free radical peroxy and azo type compounds, such as azodiisobutyronitrile (VAZO-64), azodiisovaleronitrile (VAZO-52), dimethylazodiisobutyrate (WAKO 601), 2,2'-azobis(isobutyronitrile), 2,2'-azobis(N,N'-dimethyleneisobutyramidine)dihydrochloride, 2,2'-azobis(2-amidinopropane)dihydrochloride, 2,2'-azobis(N,N'-dimethyleneisobutyramidine), 1,1'-azobis(1-cyclohexanecarbo-nitrile), 4,4'-azobis(4-cyanopentanoic acid), 2,2'-azobis(isobutyramide) dihydrate, 2,2'-azobis(2-methylpropane), 2,2'-azobis(2-methylbutyronitrile), VAZO 67, cyanopentanoic acid, the peroxy pivalates, dodecylbenzene peroxide, benzoyl peroxide, di-t-butyl hydroperoxide, t-butyl peracetate, acetyl peroxide, dicumyl peroxide, cumyl hydroperoxide, dimethyl bis(butylperoxy) hexane and generally any of the solid or liquid oil-soluble free radical initiators conveniently employed for polymerizations involving monomers containing olefinic unsaturation.

In the above emulsification process, the surfactant may be introduced separately, with the free radical initiator, or with the mutual solvent or can be omitted from the free radical delivery system and instead introduced directly into the monomeric polymerization mixture. However, it is preferred to include surfactant in the delivery system for the additional improvement realized thereby. Specifically, the presence of surfactant provides for improved homogeneous distribution of the fine particles in the emulsion.

The surfactant added to the delivery system is employed in an amount between about 1.0 and about 100 wt. %, preferably between about 5.0 and about 50 wt. %, with respect to initiator. The most preferred amount of surfactant which achieves the highest dispersibility of coprecipitated initiator in water and minimum coprecipitate particle size is between about 10 wt. % and about 30 wt. % surfactant per weight of initiator. The surfactant also materially alters the solubility of the initiator and brings the polymer and initiator into more intimate contact prior to coprecipitation. Surfactants which have been found particularly beneficial in minimizing emulsion particle or droplet size in the emulsion product include oxygen or sulfate containing compounds such as $N-C_8$ to C12 alkyl pyrrolidones, $C_{10}$ to $C_{14}$ alkyl sulfates, e.g. sodium dodecyl sulfate, polyglycerides, ethoxylated alcohols or acids, an ethoxylated or propoxylated alkyl phenol containing 6 to 50 alkoxy units, e.g. average 9 ethoxylated nonyl phenol (Igepal® CO-630) and average 40 ethoxylated nonyl phenol (Igepal® CO-890) and mixtures of these surfactants.

The polymer which is dissolved in the mutual solvent with the initiator can be any homopolymer or copolymer of a $C_1$ to $C_4$ alkenyl monomer polymerized product which includes the polymers of vinyl, propenyl, etc. containing monomers such as N-vinyl pyrrolidone, N-vinyl caprolactam, vinyl acetate, alkyl vinyl ethers, styrene, isoprene, maleic acid, maleic anhydride, lower alkyl acrylates or methacrylates and the like, as well a copolymer or terpolymer involving mixtures of these or other monomers, such as dialkylaminoalkyl acrylates or methacrylates, butadiene, amides and methacrylamides.

The initiator and polymer are combined in a weight ratio of between about 1:5 and about 1:1.5; a ratio of between about 1:3 and about 1:2.5 being preferred. It is to be understood that the polymer dissolved with initiator in the delivery system can be the homopolymer of only one of the monomers subsequently employed in a copolymerization process or it can be the copolymeric, or terpolymeric product of the reaction. Thus, in the polymerization of N-vinyl pyrrolidone, N-vinyl caprolactam and dimethylaminoethylmethacrylate, the polymer mixed with initiator may be the homopolymer of vinyl pyrrolidone alone, the homopolymer of vinyl caprolactam alone, the copolymer of vinyl pyrrolidone and vinyl caprolactam or the terpolymeric product of the polymerization reaction. Generally it is preferred that the polymer mixed with initiator in the delivery system is the product of the polymerization process. The number average molecular weight of the polymer employed in the delivery system, can vary over a wide range, e.g. from about 3,000 to about 1,000,000, more desirably from about 10,000 to about 500,000; however, the polymer should be one which is easily dissolved in the mutual solvent.

The polymer and initiator are dissolved in between about 5 and about 15 parts, preferable between about 8 and about 12 parts by weight based on initiator, of a mutual solvent having a boiling point below 140° C., most desirably below 90° C. at atmospheric pressure. Suitable solvents include the alcohols e.g. methanol, ethanol, isopropanol, butanol, cyclohexanol, hydrocarbons e.g. hexane, cyclohexane, etc., acetone, tetrahydrofuran, methylene ,chloride, ethylacetate, aromatic solvents, e.g. toluene, xylene, mixtures of the above or any other inert, vaporizable solvent capable of dissolving both the initiator .and polymer in the above mixture. The mixture is formed under ambient conditions of temperature and pressure and, after a uniform solution is obtained, the solvent is removed by evaporation by a stream of nitrogen purge gas or by spray drying to form coprecipitated initiator/polymer microparticles. The large amount of initiator employed in the coprecipitated particles of the present delivery system considerably aides in providing the intimate contact needed for homogeneous distribution of the coprecipitated particles. These factors ensure stability in the final initiator feed product produced as an aqueous emulsion of the coprecipitate.

Since certain free radical initiators are temperature sensitive, care must be taken to ensure that the drying step to remove solvent is carried out at a temperature at which initiator decomposition does not occur. This is of particular concern when employing high boiling mutual solvents, e.g. toluene (b.p. 111° C.) and xylene (b.p. 138° C.). In these cases, the solvent is removed under a vacuum such that the drying temperature does not exceed about 90° C., preferably not in excess of 65° C.

After the solvent has been removed, the low viscosity emulsion of the present invention is formed by the addition of from about 5 to about 50 parts by weight of water under vigorous agitation. Coprecipitated particle droplets containing surfactant of between about 0.01 and about 100 micron diameter, preferably between about 0.1 and about 50 micron diameter are thus prepared as a stable emulsion which can then be suitably employed as the initiator feed to a free radical polymerization reaction and may be introduced at the beginning or gradually throughout the ensuing polymerization. The viscosity of the emulsion is such that the feed may be easily pumped into the reactor; in this regard a Brookfield viscosity of from about 6,000 cps to about 50,000 cps is desirable and from about 12,000 to about 30,000 cps is most desirable.

Particularly preferred applications of the present initiator/polymer/surfactant emulsion involve the homopolymerization of N-vinyl pyrrolidone using dimethyl 2,2'-azobisisobutyrate (WAKO 601) initiator and a polyvinyl pyrrolidone having a number average molecular weight of from about 5,000 to about 600,000 in the emulsified feed or the copolymerization of N-vinyl pyrrolidone with vinyl ester, acrylate, methacrylate, acrylamide and methacrylamide using 2,2'-azobis(2-methylbutyronitrile (VAZO 67) or azodiisobutyronitrile (VAZO 64) as the initiator and the above N-vinyl pyrrolidone homopolymer in the pumpable low viscosity ,emulsified feed to the polymerization reactor.

The total amount of initiator/polymer/surfactant emulsion used in the polymerization reaction is within the conventional range of from about 0.01 to about 3.5 wt. %, more often from about 0.02 to about 1.5 wt. %, based on initiator to total monomer.

The present initiator delivery system possesses many advantages over those of the art in that no extraneous compounds are introduced into the polymerization reaction mixture. The presence of surfactant in the above critical range allows high water dispersibility of substantially water insoluble initiators in the coprecipitated form and also minimizes the particle size of the coprecipitated particles in the emulsion. Also, the dilution of the stable coprecipitated particles can be easily regulated to meet the needs of the reaction and avoid plugging of apparatus. Additionally, the microparticle size droplets in the emulsion ensures maximum efficiency of initiator properties.

It is found that the introduction of a coprecipitated initiator-polymer feed to the polymerization reactor accomplishes additional unexpected advantages in addition to providing a narrow, fine particle size dispersion in water. Such a dispersion provides a uniformly distributed reaction medium resulting in a narrower molecular weight distribution of the final polymer product and uniformity in the copolymer backbone. Further, the coprecipitated particles avoids polymer formation in feed lines which has posed line clogging problems in prior processes where the initiator is introduced as a solution with monomer. Avoidance of this problem assures continuous feed operation without loss of monomer or time to clear lines. Still further, the coprecipitated feed avoids undesirable affects arising from concentrated zones of initiator leading to local "hot spots" with consequent loss of temperature control and branching in the polymeric product. Finally, it is clear that the present process provides the most efficient use of initiator in the free radical polymerization of monomers having olefinic unsaturation.

Having thus generally described the invention, reference is now had to the following examples which illustrate specific and preferred embodiments but which are not to be construed as limiting to the scope of the invention as more broadly set forth above and in the appended claims.

EXAMPLE 1

To a 20 liter reactor was charged 3077 grams of deionized water, 1033 grams of vinylpyrrolidone, 4.6 grams of ammonium hydroxide (28% aqueous), and 0.45 grams of tetrasodium ethylenediamine tetraacetic acid (EDTA). The mixture was purged with nitrogen to remove air while agitating at 250 rpm's and then heated to 75° C.

In a separate vessel, 3.3 grams of WAKO 601 initiator, 0.33 grams of Igepal® CO-630 and 9.9 grams poly(N-vinylpyrrolidone), i.e. PVP, having a K-value of 80 were dissolved in 20 ml of methanol, after which the methanol was removed under vacuum, leaving a solid coprecipitate of initiator and polymer. The solid product was finely dispersed in 33 grams of water to form an emulsion having a particle size of 6–38 microns. The resulting emulsion was then added to the polymerization reactor at 75° C. with agitation. After 30 minutes, 7535 grams of water and 2297 grams of vinylpyrrolidone was pumped over a 2 hour period into the reactor at a rate of 80 ml/hr. and after an additional 30 minutes, another initiator emulsion charge was made. This emulsion, gradually introduced over a period of 4 hours, was separately prepared as above except that 6.8 grams of WAKO 601, 0.68 grams of Igepal® CO-630, 20.4 g of PVP and 68 grams of deionized water were used. The resulting reaction mixture was then held for an additional hour at 75° C. before being discharged from the reactor. The resulting PVP solution, in 24.5% polymer concentration, had a K-value of 84.

EXAMPLE 2

To a 20 liter reactor was charged 3077 grams of deionized water, 1033 grams of vinylpyrrolidone, 4.6 grams of ammonium hydroxide (28% aqueous), and 0.45 grams of tetrasodium ethylenediamine tetraacetic acid (EDTA). The mixture was purged with nitrogen to remove air while agitating at 250 rpm's and then heated to 75° C.

In a separate vessel, 2 grams of VAZO 67 initiator, 0.4 grams of Igepal® CO-630 and 6 grams poly(N-vinylpyrrolidone), i.e. PVP, having a K-value of 80 were dissolved in 20 ml of tetrahydrofuran (THF), after which the THF was removed under vacuum, leaving a solid coprecipitate of initiator and polymer. The solid product was finely dispersed in 20 grams of water to form an emulsion having a particle size of 9–33 microns. The resulting emulsion was then added to the polymerization reactor at 75° C. with agitation. After 30 minutes, 7535 grams of water and 2297 grams of vinylpyrrolidone was pumped over a 2 hour period into the reactor at a rate of 80 ml/hr. and after an additional 30 minutes, another initiator emulsion charge was made. This emulsion, gradually introduced over a period of 4 hours, was separately prepared as above except that 4.2 grams of VAZO 67, 0..84 grams of Igepal® CO-630, 12.6 g of PVP and 42 grams of deionized water were used. The resulting reaction mixture was then held for an additional hour at 75° C. before being discharged from the reactor. The resulting PVP solution, in 23.8% polymer concentration, had a K-value of 82.

EXAMPLE 3

To a 20 liter reactor was charged 3077 grams of deionized water, 1033 grams of vinylpyrrolidone, 4.6 grams of ammonium hydroxide (28% aqueous), and 0.45 grams of tetrasodium ethylenediamine tetraacetic acid (EDTA). The mixture was purged with nitrogen to remove air while agitating at 250 rpm's and then heated to 75° C.

In a separate vessel, 1.7 grams of VAZO 64 initiator, a mixture of 0.34 grams of N-octyl pyrrolidone and 0.03 grams of sodium dodecyl sulfate in 10 grams of water and 5.1 grams poly(N-vinylpyrrolidone), i.e. PVP, having a K-value of 90 were dissolved in 20 ml of acetone, after which the acetone was removed under vacuum, leaving a solid coprecipitate of initiator and polymer. The solid product was finely dispersed in 10 grams of water to form an emulsion having a particle size of 11–42 microns. The resulting emulsion was then added to the polymerization reactor at 75° C. with agitation. After 30 minutes, 7535 grams of water and 2297 grams of vinylpyrrolidone was pumped over a 2 hour period into the reactor at a rate of 80 ml/hr. and after an additional 30 minutes, another initiator emulsion charge was made. This emulsion, gradually introduced over a period of 4 hours, was separately prepared as above except that 3.8 grams of VAZO 64, 0.76 grams of N-octyl pyrrolidone, 0.08 grams of sodium dodecyl sulfate, 11.4 g of PVP and 46 grams of deionized water were used. The resulting reaction mixture was then held for an additional hour at 75° C. before being discharged from the reactor. The resulting PVP solution, in 21% polymer concentration, had a K-value of 97.

EXAMPLE 4

To a 20 liter reactor was charged 3077 grams of deionized water, 1033 grams of vinylpyrrolidone, 4.6 grams of ammonium hydroxide (28% aqueous), and 0.45 grams of tetrasodium ethylenediamine tetraacetic acid (EDTA). The mixture was purged with nitrogen to remove air while agitating at 250 rpm's and then heated to 100° C.

In a separate vessel, 5.5 grams of VAZO 52 initiator, 1.65 grams of Igepal® CO-890 and 20 grams poly(N-vinylpyrrolidone), i.e. PVP, having a K-value of 60 were dissolved in 20 ml of methanol, after which the methanol was removed under vacuum, leaving a solid coprecipitate of initiator and polymer. The solid product was finely dispersed in 45 grams of water to form a microemulsion having a particle size of 5–41 microns. The resulting emulsion was then added to the polymerization reactor at 75° C. with agitation. After 30 minutes, 7535 grams of water and 2297 grams of vinylpyrrolidone was pumped over a 2 hour period into the reactor at a rate of 80 ml/hr. and after an additional 30 minutes, another initiator emulsion charge was made. This emulsion, gradually introduced over a period of 4 hours, was separately prepared as above except that 1.9 grams of VAZO 52, 0.57 grams of Igepal® CO-890, 7.5 g of PVP and 18 grams of deionized water were used. The resulting reaction mixture was then held for an additional hour at 100° C. before being discharged from the reactor. The resulting PVP solution, in 22.9% polymer concentration, had a K-value of 63.

While the invention has been described with particular reference to certain embodiments thereof, it will be understood that changes and modifications may be made which are within the skill of the art and the scope of this invention.

What is claimed is:

1. A stable free radical delivery system for a free radical polymerization of a monomer containing olefinic unsaturation which comprises: a pumpable aqueous emulsion of from 0.01 to 100 micron diameter coprecipitated microparticles of a water insoluble free radical initiator with a polymer having a number average molecular weight of between 3,000 and 1,000,000 derived from a monomer having olefinic unsaturation combined in a weight ratio of between about 1:5 and about 1:1.5.

2. The delivery system of claim 1 which additionally contains between about 1 and about 100 wt. % of an oxygen- or sulfate- containing surfactant based on initiator.

3. The delivery system of claim 2 which contains between about 5 and about 50 wt. % of said surfactant based on said initiator.

4. The delivery system of claim 1 wherein the weight ratio of initiator to polymer in the coprecipitate is between about 1:3 and about 1:2.5.

5. The delivery system of claim 1 wherein the coprecipitated microparticles have a diameter of from about 0.1 to about 50 microns.

6. The delivery system of claim 2 wherein the surfactant is an ethoxylated $C_8$ to C12 alkyl phenol.

7. The delivery system of claim 6 wherein the number average molecular weight of said polymer is between about 10,000 and about 500,000.

8. The delivery system of claim 1 which contains between about 5 and about 50 parts by weight of water.

9. The delivery system of claim 1 having a Brookfield viscosity of from about 6,000 to about 50,000 cps.

10. The delivery system of claim 1 for the polymerization of an N-vinyl lactam wherein the polymer in the delivery system is a corresponding vinyl lactam polymer.

11. The delivery system of claim 1 wherein the amount of surfactant is between about 5 and about 50 wt. % based on initiator.

* * * * *